United States Patent
Mouskis

(10) Patent No.: US 8,152,104 B2
(45) Date of Patent: Apr. 10, 2012

(54) DROGUE ILLUMINATION

(75) Inventor: Christopher Mouskis, Dorset (GB)

(73) Assignee: Flight Refuelling Limited, Dorset (GB)

( * ) Notice: Subject to any disclaimer, the term of this patent is extended or adjusted under 35 U.S.C. 154(b) by 692 days.

(21) Appl. No.: 12/282,723

(22) PCT Filed: Mar. 8, 2007

(86) PCT No.: PCT/GB2007/000829
§ 371 (c)(1), (2), (4) Date: Feb. 27, 2009

(87) PCT Pub. No.: WO2007/104942
PCT Pub. Date: Sep. 20, 2007

(65) Prior Publication Data
US 2009/0302161 A1 Dec. 10, 2009

(30) Foreign Application Priority Data
Mar. 15, 2006 (GB) .................................. 0605212.0
Mar. 23, 2006 (GB) .................................. 0605863.0

(51) Int. Cl.
*B64D 37/02* (2006.01)
*B64D 39/00* (2006.01)
(52) U.S. Cl. ................. 244/135 R; 244/135 A
(58) Field of Classification Search ............... 244/135 A, 244/135 R
See application file for complete search history.

(56) References Cited

U.S. PATENT DOCUMENTS

| 5,539,624 | A  | * | 7/1996  | Dougherty | ............... | 362/556 |
| 6,464,173 | B1 |   | 10/2002 | Bandak    |                 |         |
| 6,988,693 | B2 | * | 1/2006  | Shelly    | ............... | 244/135 A |
| 7,036,770 | B2 | * | 5/2006  | Shelly et al. | ........... | 244/135 A |
| 2005/0017130 | A1 | * | 1/2005 | Shelly et al. | ........... | 244/135 A |
| 2005/0145751 | A1 | * | 7/2005 | Shelly | ............... | 244/135 A |
| 2005/0269455 | A1 | * | 12/2005 | Hewitt et al. | ........... | 244/135 A |
| 2006/0060709 | A1 |   | 3/2006  | Thal      |                 |         |

FOREIGN PATENT DOCUMENTS
EP 1 094 001 A2 4/2001

OTHER PUBLICATIONS

UK Search Report dated Jul. 4, 2006 for corresponding United Kingdom Application No. GB0605863.0 (1 page).
International Preliminary Report on Patentability issued Sep. 16, 2008, for corresponding PCT International Application No. PCT/GB2007/000829 (5 pages).

* cited by examiner

*Primary Examiner* — David H Bollinger
(74) *Attorney, Agent, or Firm* — Finnegan, Henderson, Farabow, Garrett & Dunner, LLP

(57) ABSTRACT

In a reception coupling and drogue assembly (2), light sources (32) are arranged around the wall (26) of the probe passage adjacent the opening (24). The light sources (32) each serve to illuminate the opposing part of the drogue, giving good visibility to the pilot of the following aircraft.

12 Claims, 3 Drawing Sheets

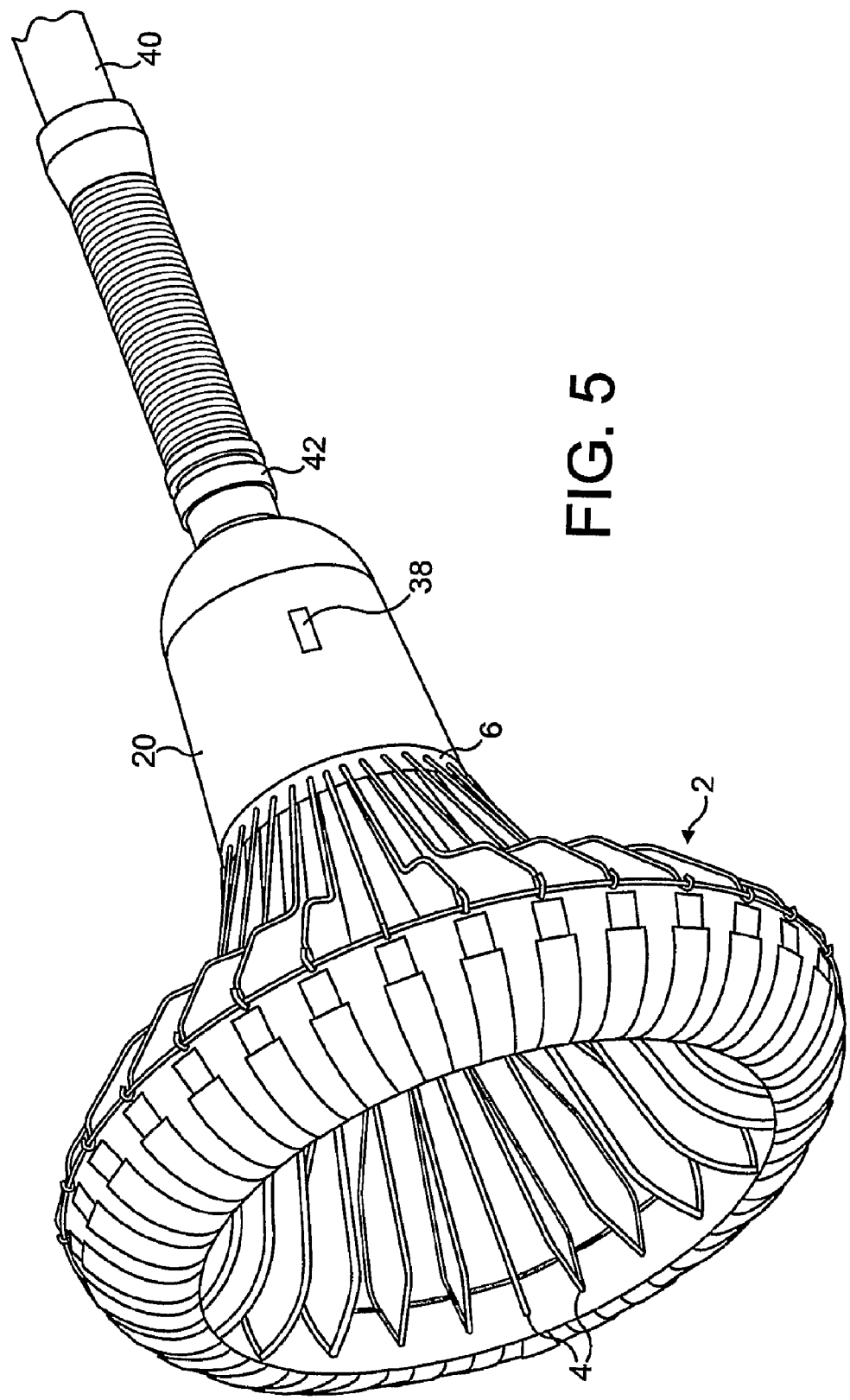

DROGUE ILLUMINATION

Figure 1:
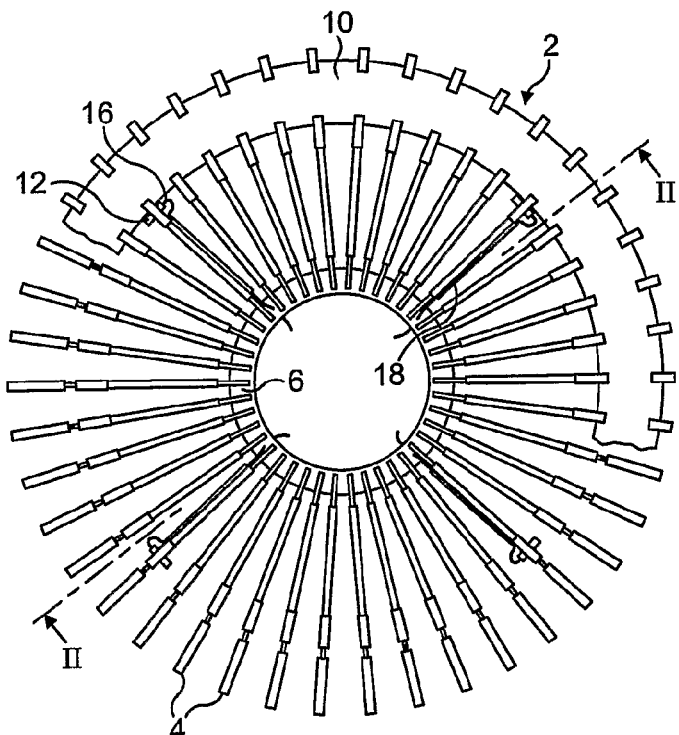

This invention relates to the illumination of drogues used for refuelling aircraft in flight.

Refuelling drogues are used to stabilise a refuelling hose trailing from a fuel tanker aircraft. They also provide the drag required to maintain the hose catenary and the mating force with a probe from an aircraft to be refuelled. The drogue is attached to a reception coupling unit at the end of the hose, which has a passage for receiving the probe nozzle, and supports a canopy or parachute surrounding the passage opening and providing drag for the coupling unit.

Known drogues comprise a circumferential array of ribs extending from the passage opening both backwardly and outwardly, in a part-conical shape. These ribs support a parachute member, also known as a canopy, such as an annular strip of sheet material, near the ends thereof for providing drag. In order to assist the pilot of the following aircraft to align the probe with the drogue and reception coupling passage in low light or darkness, the drogue may be illuminated. This has previously been achieved by mounting a light source such as an incandescent lamp through an aperture in selected ones of ribs (typically four) spaced around the array. It has been necessary to provide a conduit for a wire supplying power to the lamp, the conduit being attached along the length of the respective rib, and an aperture for routing the wire through the interface with the reception coupling unit, and into the unit, where a power source can be housed.

This arrangement has the disadvantage that the lamp and the conduit increase parasitic drag force across the rib. Furthermore, the light is partially obscured by the adjacent rib in each position, restricting the overall visibility of the target area. The lighting arrangement is also susceptible to damage if struck by the probe.

The present invention aims to provide a drogue assembly with improved illumination.

According to the present invention there is provided a reception coupling and drogue assembly for in-flight refuelling comprising: a reception coupling for attachment to a refuelling hose, the coupling having a passage for receiving a refuelling probe through an opening thereof; a drogue arranged adjacent the periphery of the opening; and a light source for illuminating the assembly, the light source being mounted on the reception coupling and being arranged to direct light towards the drogue.

Thus the light source and associated wiring may be contained within the reception coupling unit, alleviating the problem of parasitic drag of the drogue, and removing the need for wires to pass through the interface between the drogue and the coupling unit. Furthermore, the light from the light source is not obscured by the ribs of the drogue.

For example, the light source may be in the probe passage in the reception coupling. Preferably there are a plurality of light sources spaced around the circumference of the passage. These light sources are preferably provided near the opening of the passage, and are recessed so as to be flush with the passage walls.

The passage in a coupling unit commonly has a first part shaped to guide the probe nozzle towards a second part which is shaped closely to fit the probe nozzle. For example, the passage may be funnel shaped, with the first part narrowing from the opening to the second part, thus having a substantially frusto-conical shape, with the second part being cylindrical. Thus if the light sources are arranged around the surface of the first part of the passage, they will be clearly visible to the following pilot. Furthermore, the light will be directed substantially normally to the frusto-conical surface and may thus impinge on the drogue ribs and canopy which are opposite the light source.

Conveniently the light sources are light emitting diodes (LEDs) mounted behind an aperture in the passage surface, and they may be powered by at least one air-driven generator located within the coupling unit.

Figure 2:
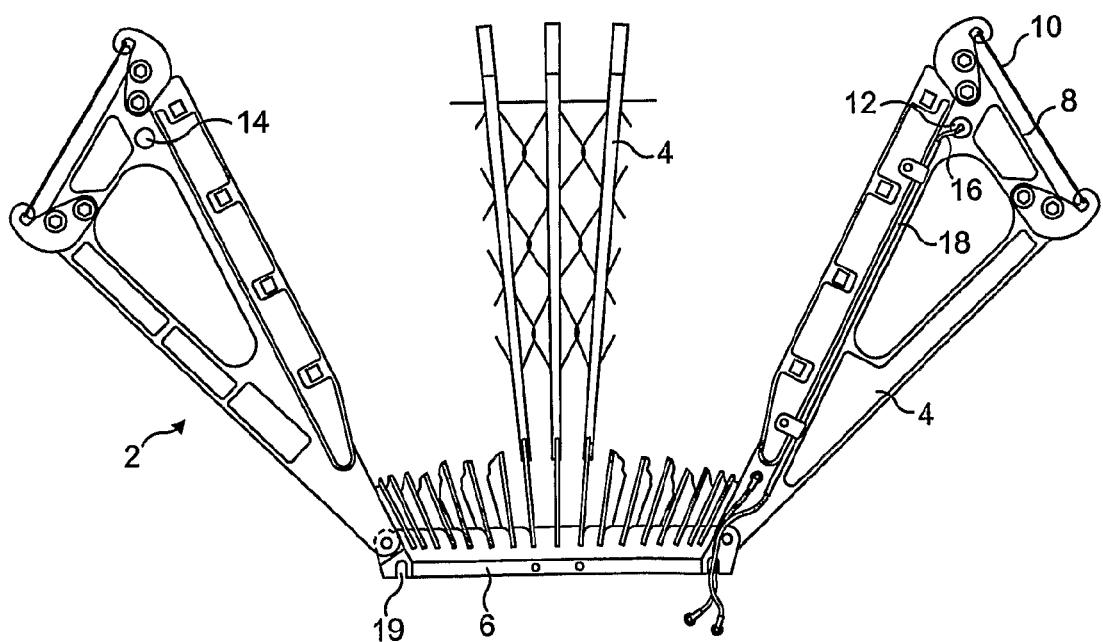
Figure 3:
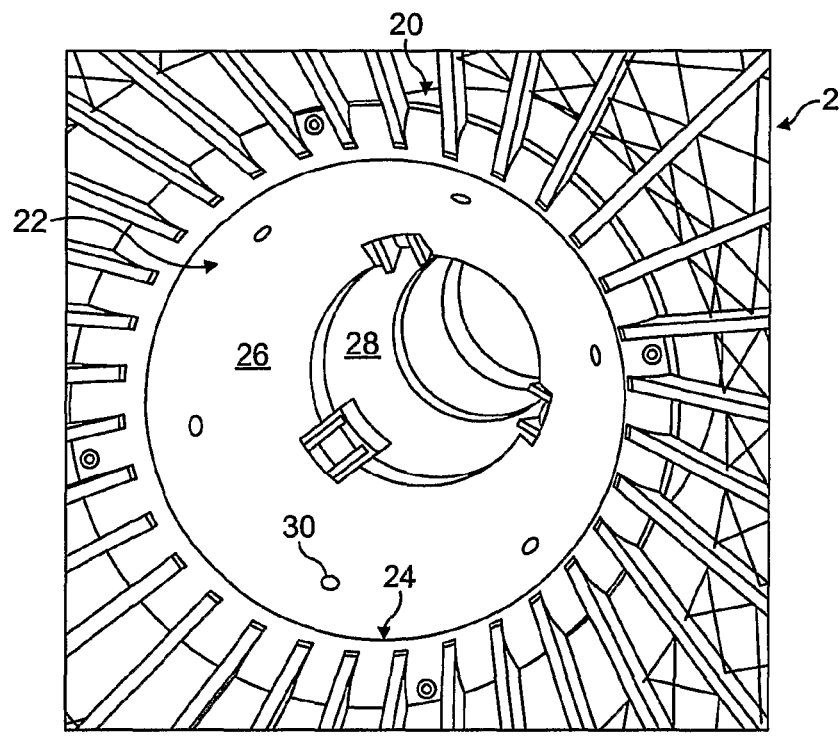
Figure 4:
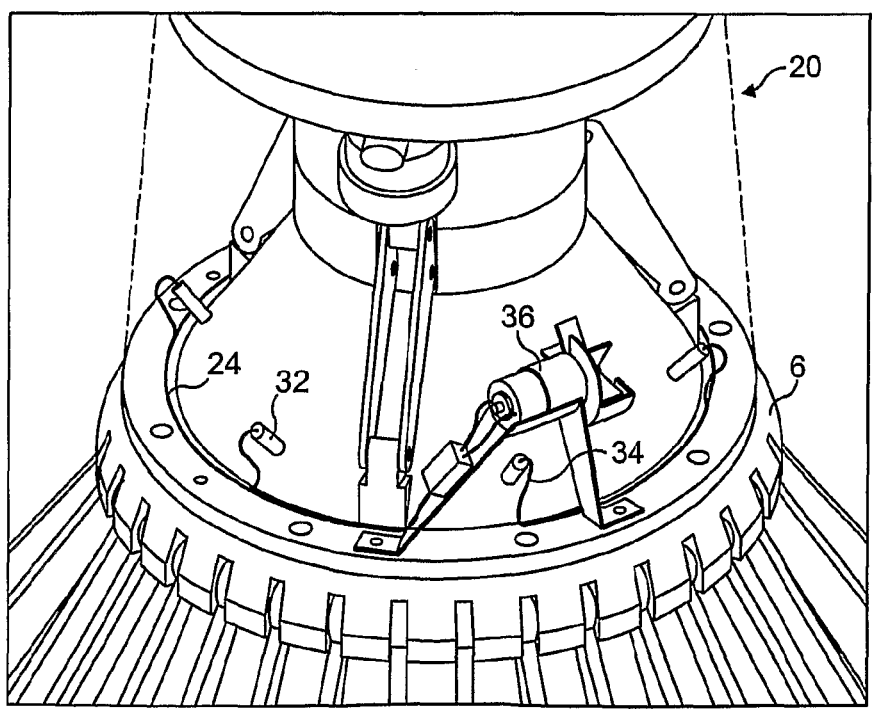

In order that the present invention may be more readily understood, reference will now be made by way of example to the accompanying drawings in which:

FIG. 1 is an end view of a drogue according to the prior art;
FIG. 2 is a cross-sectional side view of the drogue of FIG. 1 taken along the lines II-II;
FIG. 3 is a partial perspective view, as from a downstream position, of a reception coupling and drogue assembly according to one embodiment of the present invention;
FIG. 4 is a perspective view, as from an upstream position to one side, of the reception coupling and drogue assembly of FIG. 3, showing the interior of the reception coupling unit through the outer cover thereof; and
FIG. 5 is a perspective view of the reception coupling and drogue assembly of FIGS. 3 and 4 connected to a hose.

Referring to FIGS. 1 and 2, the prior art drogue, indicated generally at 2, comprises an array of ribs 4 extending outwardly away from a rim 6, which is for connection around an opening of the probe passage of a reception coupling unit (not shown). The ribs 4 extend away at an angle of around 45°, such that in use they project backwardly relative to the towing aircraft. The ribs have a shallow triangular shape, each having a short side 8 at the distal end. The short sides 8 carry an annular strip of material 10 which in use provides resistance to the air flow, acting as a parachute.

As can be seen from FIG. 1, the ribs 4 each have an aperture 14 adjacent the distal tips thereof. An incandescent lamp 12 is mounted through the aperture 14 of certain of the ribs 4 (in this case numbering four). The lamps 12 are equally spaced around the array. Each lamp 12 has a power supply wire 16 carried along the length of the rib 4 in a conduit 18 towards the rim 6. The wire 16 passes through an aperture 19 in the rim 6. The wires 16 are then routed into the reception coupling unit for connection to a power source such as an air-driven generator.

The lamps 12 help to illuminate the drogue canopy to assist the pilot trying to align the probe with the passage in the unit, which is in the centre of the drogue rim 6. However, the light tends to be mainly reflected between the rib on which each lamp 12 is mounted and the adjacent rib, limiting the luminance produced.

Referring now to FIGS. 3 and 5, the reception coupling and drogue assembly of the present invention has a drogue 2 formed of an array of ribs 4 similar to that of the prior art, but without the incandescent lamps and associated wiring. The rim 6 of the drogue 2 is connected to a reception coupling unit 20. The reception coupling unit has a passage 22 for receiving the refuelling probe, with a circular opening 24 corresponding to the shape of the rim 6.

The probe passage 22 is funnel-shaped, and includes a first part 26 having a frusto-conical shape which narrows from the opening 24 towards a central second part 28, which is cylindrical in shape and sized closely to receive the probe.

Spaced around the surface of the first part 26, close to the opening 24, is an array of equally spaced apertures 30. As shown in FIG. 4, light sources 32, such as LEDs, are mounted behind these apertures 30, so as to direct light substantially normally to the surface of the first part 26, within the coupling unit 20. Thus the light therefrom impinges upon the inside of the drogue ribs 4, as well as the canopy, opposite each light source 32. This has the effect of providing good illumination of the whole of the inside of the drogue 2 which faces the following aircraft. Power supply leads 34 run around a conduit in the rim 6 for connection to the power source such as an air-driven generator 36 mounted within the coupling unit 20.

As can be seen from FIG. 5, the coupling unit 20 includes an aperture 38 for driving the air driven generator 36. As also shown in FIG. 5, the coupling unit 20 may be attached to a refuelling hose 40 by a connector 42.

The invention claimed is:

1. A reception coupling and drogue assembly for in-flight refuelling comprising:
    a reception coupling for attachment to a refuelling hose, the coupling having a passage for receiving a refuelling probe through an opening thereof;
    a drogue arranged adjacent the periphery of the opening; and
    a light source for illuminating the assembly, the light source being mounted on the reception coupling and being arranged to direct light towards the drogue.

2. A reception coupling and drogue assembly as claimed in claim 1, in which the light source is provided in the probe passage in the reception coupling.

3. A reception coupling and drogue assembly as claimed in claim 2, comprising a plurality of light sources spaced around the circumference of the passage.

4. A reception coupling and drogue assembly as claimed in claim 3, in which the light sources are provided adjacent the opening of the passage.

5. A reception coupling and drogue assembly as claimed in claim 2, in which a wall of the probe passage extends obliquely to the opening, the light source being provided one of at and adjacent the wall.

6. A reception coupling and drogue assembly as claimed in claim 3, in which a wall of the probe passage extends obliquely to the opening, the plurality of light sources being provided one of at and adjacent the wall.

7. A reception coupling and drogue assembly as claimed in claim 3, in which each of the plurality of light sources is recessed so as to be substantially flush with a wall of the probe passage.

8. A reception coupling and drogue assembly as claimed in claim 3, in which each of the plurality of light sources comprises a light emitting diode mounted behind an aperture in a wall of the probe passage.

9. A reception coupling and drogue assembly as claimed in claim 3, in which each of the plurality of light sources is powered by at least one air-driven generator located within the reception coupling.

10. A reception coupling and drogue assembly as claimed in claim 1, in which the light source is recessed so as to be substantially flush with a wall of the probe passage.

11. A reception coupling and drogue assembly as claimed in claim 1, in which the light source comprises a light emitting diode mounted behind an aperture in a wall of the probe passage.

12. A reception coupling and drogue assembly as claimed in claim 1, in which the light source is powered by at least one air-driven generator located within the reception coupling.

* * * * *